United States Patent
Yeh et al.

(10) Patent No.: US 8,334,981 B2
(45) Date of Patent: Dec. 18, 2012

(54) ORTHOGONAL-POLARIZATION MIRAU INTERFEROMETRY AND BEAM-SPLITTING MODULE AND INTERFEROMETRIC SYSTEM USING THE SAME

(75) Inventors: Sheng-Lih Yeh, Taipei (TW);
Shyh-Tsong Lin, Taipei (TW);
Liang-Chia Chen, Taipei (TW)

(73) Assignee: National Taipei University of Technology, Taipei (TW)

( * ) Notice: Subject to any disclaimer, the term of this patent is extended or adjusted under 35 U.S.C. 154(b) by 260 days.

(21) Appl. No.: 12/703,914

(22) Filed: Feb. 11, 2010

(65) Prior Publication Data

US 2010/0214570 A1 Aug. 26, 2010

(30) Foreign Application Priority Data

Feb. 24, 2009 (TW) .............................. 98105737 A (51) Int. Cl.
*G01B 9/02* (2006.01)
(52) U.S. Cl. ........................................... 356/495
(58) Field of Classification Search .................. 356/489, 356/495, 511–514
See application file for complete search history.

(56) References Cited

U.S. PATENT DOCUMENTS

| 4,869,593 A * | 9/1989 | Biegen ........................... 356/495 |
| 5,166,751 A | 11/1992 | Massig | |
| 2006/0215171 A1* | 9/2006 | Nakata et al. .................. 356/487 |

OTHER PUBLICATIONS

Ngoi et al, Phase-shifting interferometry immune to vibration, Applied Optics, vol. 40, No. 19, Jul. 2001, pp. 3211-3213.*
J. Schmit, et al. "Improved polarization Mirau interference microscope", Optical Engineering 46(7), 077007, Jul. 2007.*
B.K.A. Ngoi, et al., Phase-shifting interferometry immune to vibration, Applied Optics, vol. 40, No. 19, Jul. 2001.*
Joanna Schmit et al., Improved Polarization Mirau Interference microscope, Optical Engineering, Jul. 2007, p. 077007-1-077007-3, vol. 46, No. 7.

* cited by examiner

*Primary Examiner* — Gregory J Toatley
*Assistant Examiner* — Dominic J Bologna
(74) *Attorney, Agent, or Firm* — Morris Manning & Martin LLP; Tim Tingkang Xia, Esq.

(57) ABSTRACT

An orthogonal-polarization Mirau interferometric system is provided, wherein a narrow-band or broad-band incident light is split into a reference light and an inspection light with the polarizations thereof being orthogonal to each other by using a beam-splitting module, while projecting the inspection light on a measured object to form an object light, and then the object light and the reference light are combined to form a combined light, and thereafter, an analyzer is utilized to modulate the polarizations and the intensities of the two lights for making the two lights interfere with each other and thus create an interference pattern. The polarization of the object light and that of the reference light can be adjusted by using an analyzer to become orthogonal to each other, and the intensities of the object light and the reference light can be adjusted to about the same for producing an interference pattern with high contrast.

12 Claims, 8 Drawing Sheets

ORTHOGONAL-POLARIZATION MIRAU INTERFEROMETRY AND BEAM-SPLITTING MODULE AND INTERFEROMETRIC SYSTEM USING THE SAME

FIELD OF THE INVENTION

The present invention relates to orthogonal-polarization Mirau interferometry, and more particularly, to an interferometer as well as a beam-splitting module and an interferometric system using the same that are designed to split a focused incident light into a reference light and an inspection light with a beam-splitting module, wherein the polarization of the reference light and that of the inspection light are orthogonal to each other, and then the inspection light is projected on a measured object to form an object light with the information corresponding to the profile of the measured object, and after that, the object light and the reference light are combined to formed a combined light with the polarization of the object light and that of the reference light being orthogonal, and thereafter, an analyzer is utilized to modulate the polarizations and the intensities of the two lights to make the two lights interfere with each other so as to create an interference pattern with high contrast.

BACKGROUND OF THE INVENTION

With rapid advance of manufacturing technology, the requirement for devices of precision measurement is increasing, especially for those used for manufacturing precision products, such as micro-electro-mechanical system (MEMS) parts, integrated circuit (IC) wafer, liquid crystal display (LCD) panel, and so on. Recently, the use of interferometry for detecting 3-D surface contour of an object has been adopted by industries for improving production yield. Operationally, the interference pattern containing information corresponding to the surface profile of a measured object for reconstructing the surface profile of the object. For precisely reconstructing the three-dimensional surface profile of the object, a clear interference pattern should be used in the following reconstruction processes. It is noted that for interferometry, the closer the intensity of its reference light is to that of its object light, the higher the fringe contrast in the resulting interferogram will be. Therefore it can create clearer and sharper interference pattern.

Figure 1:
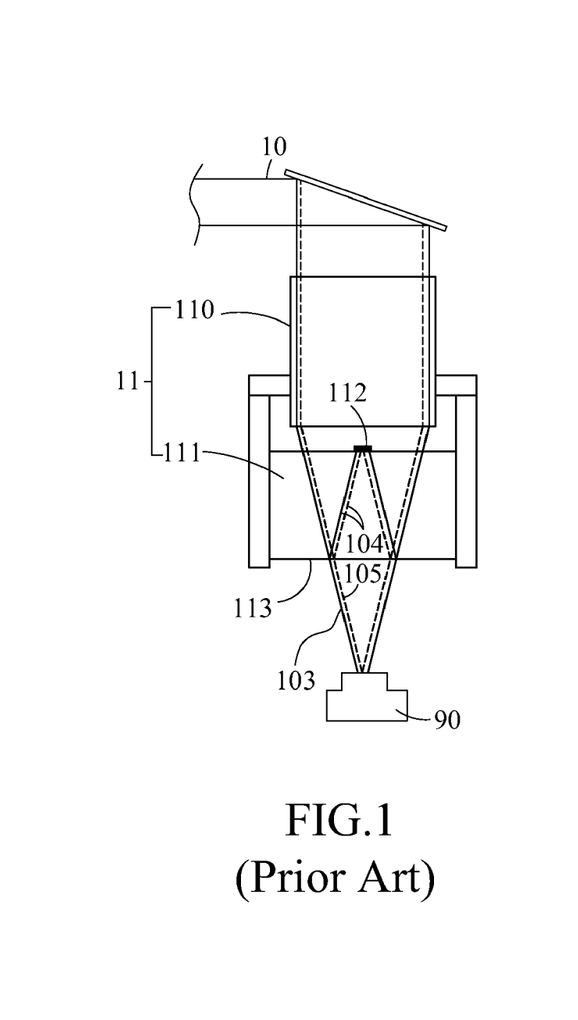
FIG. 1 is a schematic diagram for a conventional Mirau interferometer.

Please refer to FIG. 1, which is a schematic diagram showing a conventional Mirau interferometer. By the Mirau interferometer in FIG. 1, an incident light 10 after being focused by an objective 110 is incident on a beam-splitting module 111 fitted in an optic module 11, at which the focused incident light 10 is split into an inspection light 103 and a reference light 104 in a non-polarization manner by a beam-splitting layer 113 in the beam-splitting module 111 while enabling the inspection light to illuminate on a measured object 90 where it is reflected thereby to form an object light 105 containing information corresponding to the surface profile of the measured object 90. At the same time, the reference light is first reflected back to the beam-splitting layer 113 by a reflector 112, and then the reflected reference light is combined with the object light by the beam-splitting module to form a combined light that passes through the objective 110. It is noted that the reference light 104 and the object light 105 in the combined light can interfere with each other to form an interference pattern.

Figure 2:
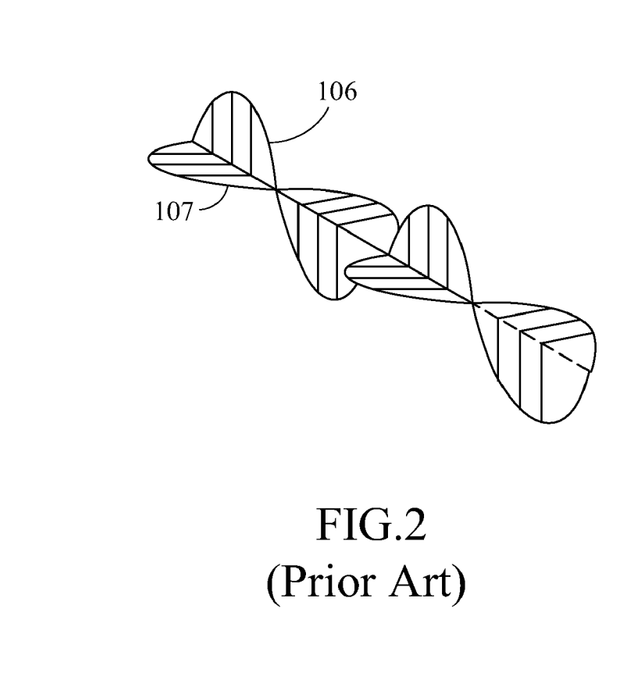
FIG. 2 is a schematic view for showing a first polarized component and a second polarized component in a combined light whose polarizations are orthogonal to each other.

Please refer to FIG. 2, which shows a first polarized component and a second polarized component in a combined light, where the polarizations of the two polarized component are orthogonal to each other. It is noted that for the incident light, reference light, inspection light and object light, they are all composed of the aforesaid first and second polarized components with orthogonal polarizations. Thus, the interference pattern in the combined light is composed of a first polarized interference pattern and a second polarized interference pattern, in which the first polarized interference pattern is created by the interference between the first polarized component of the reference light 104 and the first polarized component of the object light 105; and similarly, the second polarized interference pattern is introduced by the interference between the second polarized component of the reference light 104 and the second polarized component of the object light 105. In a conventional Mirau interferometer, the incident light 10 is not polarized, so the first polarized component and the second polarized component of the reference light 104 will have the same amplitudes and phases and that is also true for the object light 105. Therefore the first polarized interference pattern and the second polarized interference pattern are exactly the same while the superposition of the first and second polarized interference patterns in the combined light will only make the brightness of the superposed interference pattern created by the combined light double and won't make its fringe distribution change.

However, it is noted that there are some measured objects that have the ability to absorb or scatter much of the object light projected thereon, and consequently induce a big intensity difference between the object light 105 and the reference light 104. Therefore, the two polarized interference patterns, respectively created by the interference between the first polarized components of the object light 105 and the reference light 104, and the interference between the second polarized components of the object light 105 and the reference light 104, will have very low contrasts, so that the contrast of the interference pattern of the combined light is too low for analyses. Since there is no way in the conventional interferometers to adjust the relative intensities of the reference light and the object light in the combined light, the contrast of the superposed interference pattern can not be adjusted.

Therefore, it is in need of an method for adjusting the relative intensities of the reference light and the object light in the combined light so as to increase the contrast of the superposed interference pattern. For the above-mentioned reason, the reference light and the object light should be combined in an orthogonal-polarization manner before their interference to make the two lights not interfere with each other since the polarizations of the two lights are independent of each other. Because of the polarizations of the reference light and the object light are independent of each other before interference, modulating the amplitudes of the two lights respectively to reduce intensity difference between the two lights is possible. After modulating the polarizations of the two lights by using an analyzer, the polarizations of enabling the two lights are not orthogonal to each other and the two lights can interfere with each other, and consequently creating an interference pattern with high contrast. Moreover, it is also in need of a beam-splitting module and interference system adopting the aforesaid orthogonal-polarization Mirau interferometry that are capable of overcoming the problem of low-contrast interference pattern in the prior art.

There is already a study relating to polarization Mirau interferometry, which is an interferometric profilometer sensor disclosed in U.S. Pat. No. 5,166,751. The sensor defines a Mirau-like interferometer arrangement with a measured object surface and a reference surface. For precisely measuring a small distance change, a phase retarder is arranged to change the path difference between an object light and a reference light with two polarizations. Nevertheless, there are some differences between the method provided in this U.S. patent and an interferometric method provided in the present invention, which are:

(1) In the aforesaid U.S. patent, the incident light is split into an inspection light and a reference light in a non-polarization manner. However, it is intended in the present invention to split the incident light into an inspection light and a reference light with orthogonal polarizations.

(2) The main difference between the Mirau-like interferometer in the U.S. patent and those conventional Mirau interferometers is the additional phase retarder arranged in the Mirau-like interferometer. However, for meeting requirement of the phase retarder, the Mirau-like interferometer uses only narrow-band light. Nevertheless, the difference between the orthogonal-polarization interferometry in the present invention and those conventional Mirau interferometers is that: instead of the non-polarization manner in the conventional Mirau interferometers, the splitting of the incident light and the combination of the reference light and object light are accomplished in a orthogonal-polarization manner, so that the method in the present invention is adapted for the use of broadband light.

(3) In the aforesaid U.S. Patent, the reference light and the object light will interfere with each directly in the combined light. However, in the method provided in the present invention, the reference light and the object light can not interfere with each directly in the combined light and can only do so after each is being processed by a polarization modulation process.

SUMMARY OF THE INVENTION

The object of the present invention is to provide an orthogonal-polarization Mirau interferometry, by which an incident light is split into a reference light and inspection light that are orthogonal to each other, while projecting the inspection light onto a measured object to form an object light containing information corresponding to the surface profile of the measured object, and then the object light and the reference light are combined to form a combined light. Thereafter, an analyzer is utilized to modulate the polarizations and the intensities of the object light and the reference light for making the object light interfere with the reference light to create an interference pattern with high contrast. Since the polarization of the object light and reference light are orthogonal to each other, the two lights can interfere with each other only after the analyzer is utilized to modulate the polarizations thereof. Therefore, the intensities of the object light and the reference light can be adjusted to about the same for producing an interference pattern with high contrast.

It is another object of the invention to provide a beam-splitting module for the aforesaid orthogonal-polarization Mirau interferometry, which uses two polarizers, a birefringent plate, or a polarization beam-splitting layer to make the polarization of the object light and that of the reference light orthogonal to each other, wherein the object light reflected from a measured object contains information corresponding to the surface profile of the measured object. As the polarizations of the object light and the reference light are orthogonal to each other so that the two lights will not interfere with each inside the beam-splitting module, it is required to use a analyzer, disposed outside the beam-splitting module, to modulate the polarizations of the object light and the reference light so as to enable the two lights to interfere with each other for creating an interference pattern.

In an embodiment, the present invention provides an orthogonal-polarization Mirau interferometry, comprising the steps of: splitting a focused incident light into a reference light and an inspection light wherein the polarizations of the reference light and the inspection light are orthogonal to each other; projecting the inspection light onto a measured object, thereby forming an object light containing information corresponding to the surface profile of the measured object; combining the object light and the reference light into a combined light with the polarizations of the object light and the reference light being orthogonal to each other; and modulating the polarizations of the object light and the reference light such that the object light and the reference light interfere with each other.

In another embodiment, the present invention provides an orthogonal-polarization Mirau beam-splitting module comprising: a splitting means for splitting a focused incident light into a reference light and an inspection light projected onto a measured object so as to form an object light containing information corresponding to the surface profile of the measured object wherein the polarizations of the reference light and the inspection light are orthogonal to each other; and a combining means for combining the object light and the reference light into a combined light with the polarizations of the object light and the reference light being orthogonal to each other.

Yet, in another embodiment, the present invention provides an orthogonal-polarization Mirau interferometric system, comprising: a light source, for providing an incident light; an objective, for focusing the incident light to form a focused incident light; a beam-splitting module, for splitting the focused incident light into a reference light and an inspection light projected onto a measured object so as to form an object light containing information corresponding to the surface profile of the measured object, and then making the object light be combined with the reference light so as to form a combined light in a manner that the polarizations of the object light and the reference light are orthogonal to each other; and an analysis module, for modulating the polarizations of the object light and the reference light to make the object light and the reference light interfere with each other so as to form at least one interference pattern.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 3:
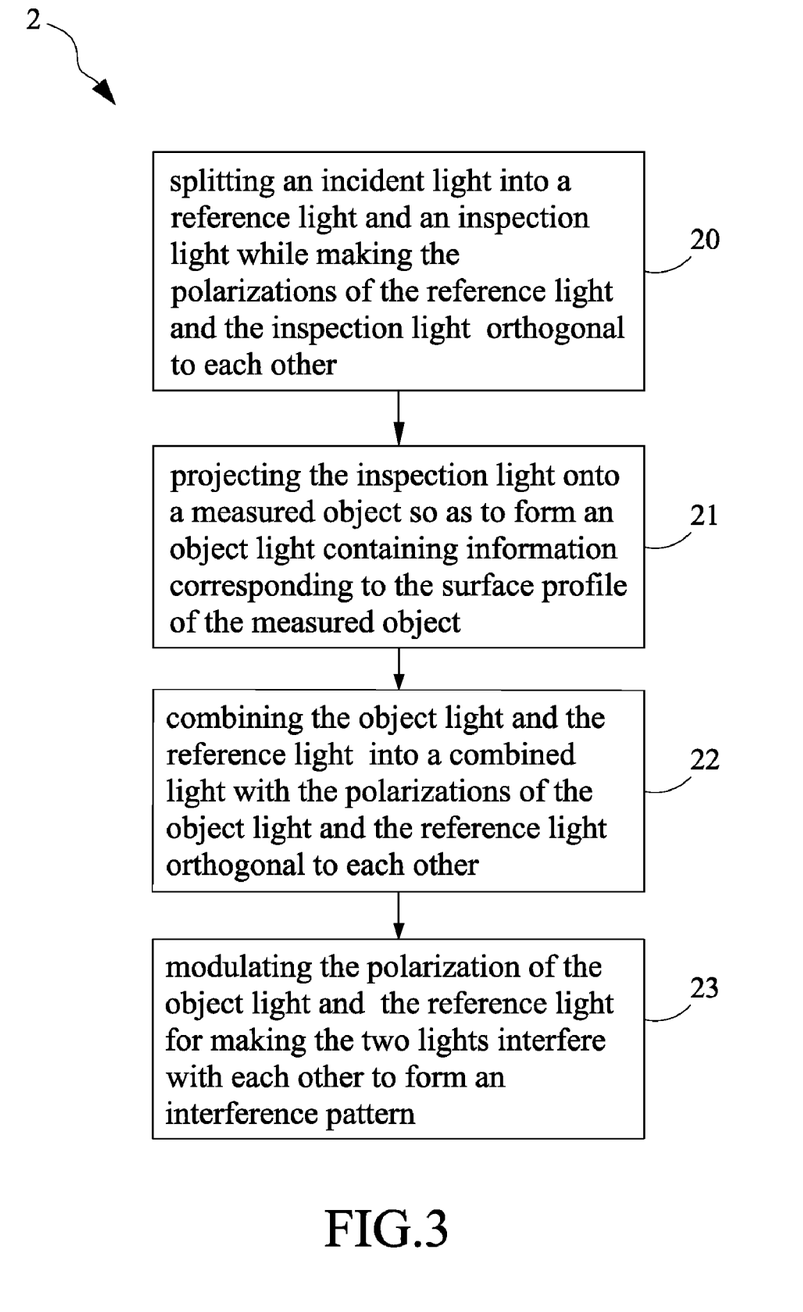
FIG. 3 is a flow chart for depicting the steps of an interferometric method according to the present invention.

Please refer to FIG. 3, which is a flow chart for depicting the steps of an interferometric method according to the present invention. The flow starts from step 20. At step 20, an incident light is split into a reference light and an inspection light while making the polarizations of the reference light and the inspection light orthogonal to each other, i.e. the incident light is orthogonal-polarization divided into two lights, the reference light and the inspection light.

Then step 21 is performed to project the inspection beam onto a measured object so as to form an object light containing information corresponding to the surface profile of the measured object; and then the flow proceeds to step 22. It is noted that as the inspection light is reflected from the surface of the measured object, the object light will contain information corresponding to the surface profile of the measured object.

At step 22, the object light and the reference light are combined to form a combined light with the polarizations of the object light and that of the reference light being orthogonal to each other; and then the flow proceeds to step 23. It is noted that since the polarizations of the object light and the reference light in the combined light are orthogonal to each other in step 22, the two lights will not interfere with each other so that adjusting their relative intensities is possible, which is different from the prior arts as the object light and the reference light are not orthogonal to each other thus will interfere with each other, thereby being impossible to adjust their relative intensities. At step 23, the polarization of the object light and that of the reference light are modulated for making the two lights to interfere with each other. It is noted that as the object light and the reference light are not orthogonal to each other any more and thus the two lights can interfere with each other in the combined light; wherein the contrast of the interference pattern can be high.

The principle for creating a high contrast interference pattern by modulating the intensities of the object light and the reference light to about the same is described hereinafter.

Assuming the intensity of the object light is $I_O$ and the intensity of the reference light is $I_R$, the intensity distribution in the interference pattern created by the coherence interference of the object light and the reference light is described as following:

$$I = I_O + I_R + 2\sqrt{I_O I_R} \cos \theta \quad (1)$$

wherein $\theta$ is the phase difference between the object light and the reference light.

It is noted that the aforesaid equation (1) can be represented as following:

$$I = (I_O + I_R)(1 + \gamma \cos \theta) \quad (2)$$

wherein $\gamma = 2\sqrt{I_O I_R}/(I_O + I_R)$ is the fringe contrast.

From equation (2), the interference pattern can posses high fringe contrast, i.e. $\gamma = 1$, when $I_O = I_R$; and $\gamma = 0.426$ when $I_O = 0.05\ I_R$; and $\gamma = 0.198$ when $I_O = 0.01\ I_R$. According to the foregoing results, the closer the intensity ratio between the object light and the reference light is to 1, the higher the fringe contrast is. Moreover, for normal cases, the range of $20 I_R \leq I_O \leq 0.05 I_R$ is the necessary condition for creating an interference pattern with enough high pattern contrast.

Figure 4:
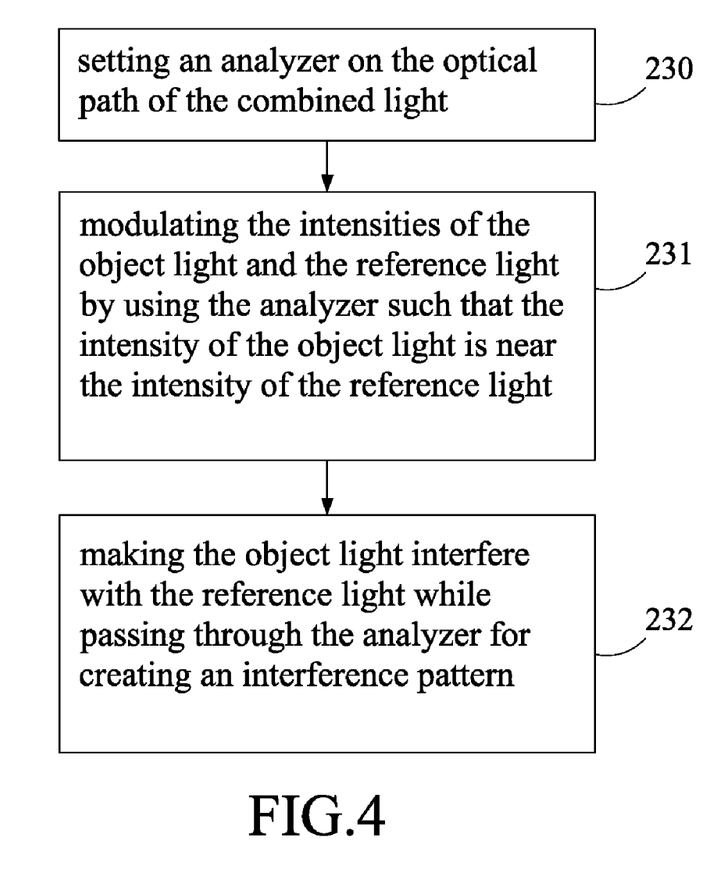
FIG. 4 is a flow chart for depicting the steps of a process for modulating the reference light and the object light to form a combine light for making the two lights interfere with each other.

Please refer to FIG. 4, which is a flow chart for depicting the steps of a process for modulating the reference light and the object light in a combined light for making the two lights interfere with each other. The flow chart of FIG. 4 is performed after the reference light and the object light leave the beam-splitting module. The flow starts from step 230. At step 230, an analyzer which can be a linear polarizer, is set on the optical path of the combined light; and then the flow proceeds to step 231. At step 231, the analyzer is utilized to modulate the intensities of the object light and the reference light such that the intensity of the object light is near the intensity of the reference light; and then the flow proceeds to step 232. It is noted that the intensities of the object light and the reference light can be adjusted simply by rotating the polarization orientation of the linear polarizer. Moreover, since the intensity difference between the object light and the reference light is affected by the material of the measured object, when there is a big difference between the intensities of the two lights, in-plane rotating the orientation of the analyzer modulates the two lights to induce near intensities, thereby generating an interference pattern with high pattern contrast. Because the filtering effect of the analyzer reduces the intensity of the interference pattern, increasing the exposure time of the image-capturing device is necessary.

Figure 5:
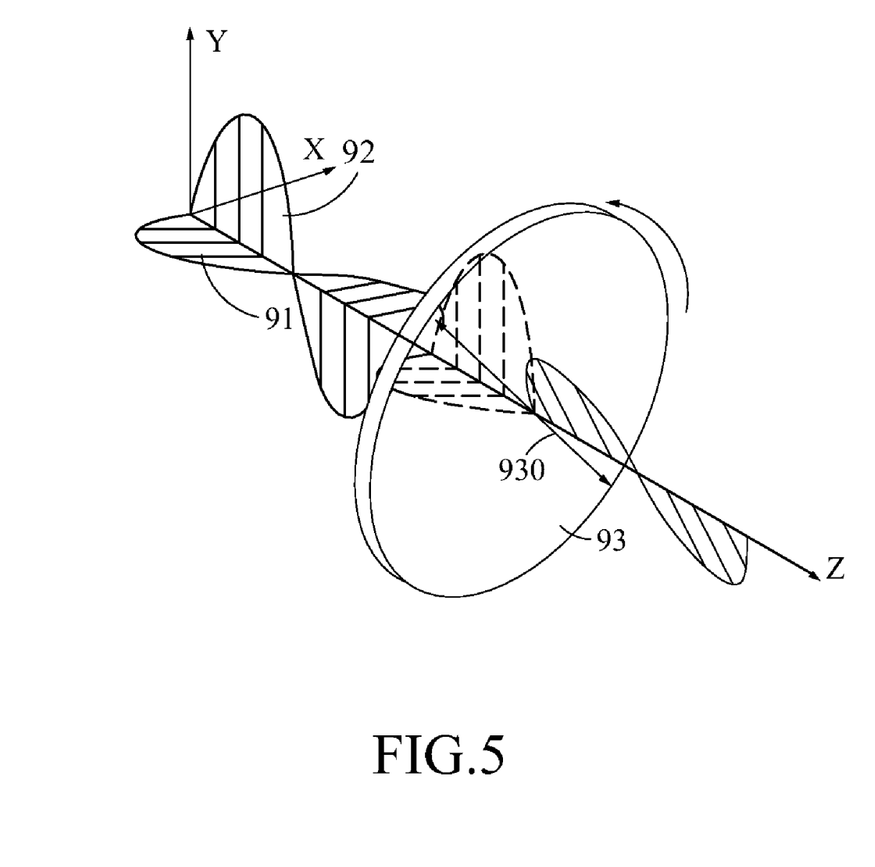
FIG. 5 is a schematic diagram for showing how the reference light and the object light in a combined light pass an analyzer.

Please refer to FIG. 5, which is a schematic diagram for showing how a reference light in a combined light and an object light pass an analyzer. In FIG. 5, the analyzer 93 is a linear polarizer with a polarization orientation along the arrow 930. When the intensity of the object light 91 is smaller than that of the reference light 92, in-plane rotate the polarization orientation 930 such that the angle between the polarization orientation 930 and the polarization plane of the reference light 92 is larger than the angle between the polarization orientation 930 and the polarization plane of the object light 91 to make the residual component of the reference light 92 along the polarization orientation 930 to be near the residual component of the object light 91 along the polarization orientation 930 so that the two residual components can form an interference pattern with high pattern contrast.

Finally at step 232, the object light and the reference light interfere with each other while passing through the analyzer to form an interference pattern. As the polarizations of the modulated reference light and the object light posses the same polarization, the two lights can interfere with each other. Moreover, the two residual components of the object and the reference light are made to be about the same, so it is possible to produce an interference pattern with enough high contrast. Besides, in an alternative embodiment, there can be more than one analyzer used. In this embodiment, as the reference light as well as the object light can be split respectively into a plurality of sub-reference lights and a plurality of sub-object lights, each sub-reference light and the corresponding sub-object light can be modulated by their corresponding analyzer to form a high-contrast interference pattern accordingly. Nevertheless, as the principle for modulating those sub-reference lights and sub-object lights is similar to those described in FIG. 4, it will not be described further hereinafter.

Figure 6:
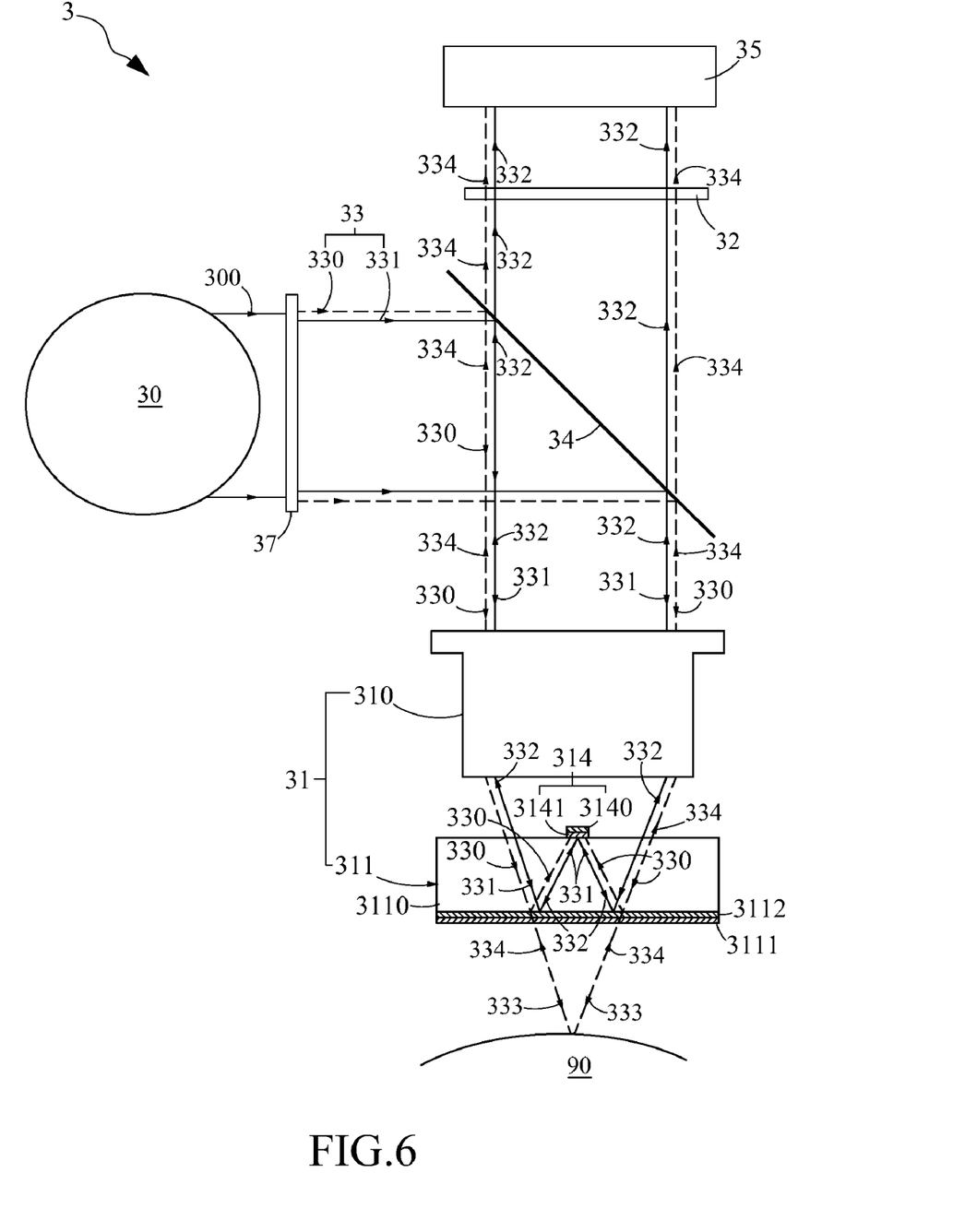
FIG. 6 is a schematic diagram for showing an interferometric system according to an embodiment of the present invention.

Please refer to FIG. 6, which is a schematic diagram for showing an embodiment of an interferometric system according to the present invention. The interferometric system 3 of FIG. 5 comprises: a light source 30, an optical module 31 and an analysis module 32. The light source 30 is used for providing a light 33 reflected to the optical module 31 by a non-polarization beam-splitting unit 34. In this embodiment, the light 33 comprises a first polarized component 330 and a second polarized component 331. The optical module 31 has an objective 310 and a beam-splitting module 311. The objective 310 is used for focusing the light 33; and the beam-splitting module 331 is used for splitting the focused light 33 into a reference light 332 and an inspection light 333 wherein the polarizations of the reference light 332 and inspection light 333 are orthogonal to each other. The inspection light 333 is projected onto a measured object 90 disposed outside the beam-splitting module 331, thereby forming an object light 334 containing information corresponding to the surface profile of the measured object 90. The object light 334 goes back to the beam-splitting module 311 and is combined with the reference light 332 in an orthogonal-polarization manner so as to form a combined light, which passes through the objective 310 and then leaves the optical module 31 and passes the non-polarization beam-splitting unit 34.

The analysis module 32, set at a side of the optical module 31, is utilized to modulate the polarizations of the reference light 332 and the object light 334 in the combined light passing the non-polarization beam-splitting unit 34 such that the polarizations of the residual reference light and the residual object light are the same. Then the reference light 332 interferes with the object light 334 to form at least one interference pattern. In this embodiment, the analysis module 32 is an analyzer that can be a linear polarizer. It is noted that the intensities of the object light 334 and the reference light 332 can be adjusted by in-plane rotating the polarization orientation of the analyzer such that the reference light 332 can interfere with the object light 334 so as to generate an interference pattern with high contrast. Thereafter, the interference pattern can be captured by an imaging device 35, which can be, but should not be limited to, a CCD or CMOS image sensors, and can be analyzed by processes performed later on.

The polarization orientation of the analyzer can be adjusted to meet different operation conditions. For instance, when the profile measurement is performed with respect to an object with a large surface slope, the raw intensity of its reference light will be significantly larger than that of the object light. Therefore, it is intended to in-plane rotate the polarization orientation of the analyzer to make the intensity of residual component of the reference light is similar to that of the object light such that the interference pattern can have high pattern contrast. Nevertheless, since the intensity of the original reference light is much reduced, the intensity of the interference pattern will be too small so that it is required to increase the exposure time of the imaging device.

In addition, when the profile measurement is performed on an object whose scattering rate in not uniform throughout the surface, it is intended to in-plane rotate the polarization direction of the analyzer continuously in range with 180 degrees for every scanning depth so as to enable each and every portion of the resulting interference pattern to have maximum contrast corresponding to different polarization orientations. Thereafter, the plurality of portions with maximum contrast in the interference pattern are integrated so as to obtain the information corresponding to the surface profile of the object.

In the embodiment shown in FIG. 6, the beam-splitting module 311 comprises a substrate 3110, a first polarization layer 3111 and a polarization-reflective layer 314. The substrate 3110 is made of a transparent material for allowing the light 33 to pass therethrough. The material of the substrate 3110 can include, but should not be limited to, a piece of glass or plastics. There is a non-polarization beam-splitting layer 3112 disposed at a side of the substrate 3110, and by enabling the light 33 to pass through the non-polarization beam-splitting layer 3112, a transmission light and a reflection light formed wherein both the transmission light and the reflection light are respectively composed of a first polarization component 330 and a second polarization component 331. The polarization directions of the first and second polarization components 330 and 331 are orthogonal to each other. When the transmission light passes through the first polarization layer 3111, its second polarization component 331 will be filtered out so that the first polarization component 330 passing through the first polarization layer 3111 is projected onto the measured object 90, thereby being reflected from the surface of the measured object 90 so as to form an object light 334. At the same time, the first polarization component 330 is filtered out after reflecting from the polarization-reflective layer 314 while, consequently, the second polarization component is kept for being a reference light 332. Moreover, in the present embodiment, the polarization-reflective layer 314 further comprises a second polarization layer 3141 and a non-polarization reflective layer 3140, in which the second polarization layer 3141 is used for filtering out the first polarization component 330; while the non-polarization reflective layer 3140 is used for reflecting the second polarization component 331. Since only the second polarization component 331 is remained after the reference light is reflected back to the beam-splitting later 3112 as well as only the first polarization component 330 is remained in the object light 334 so that the polarizations of the reference light 332 and the object light 334 are orthogonal to each other when they are combined by the non-polarization beam-splitting layer 3112.

Figure 7A:
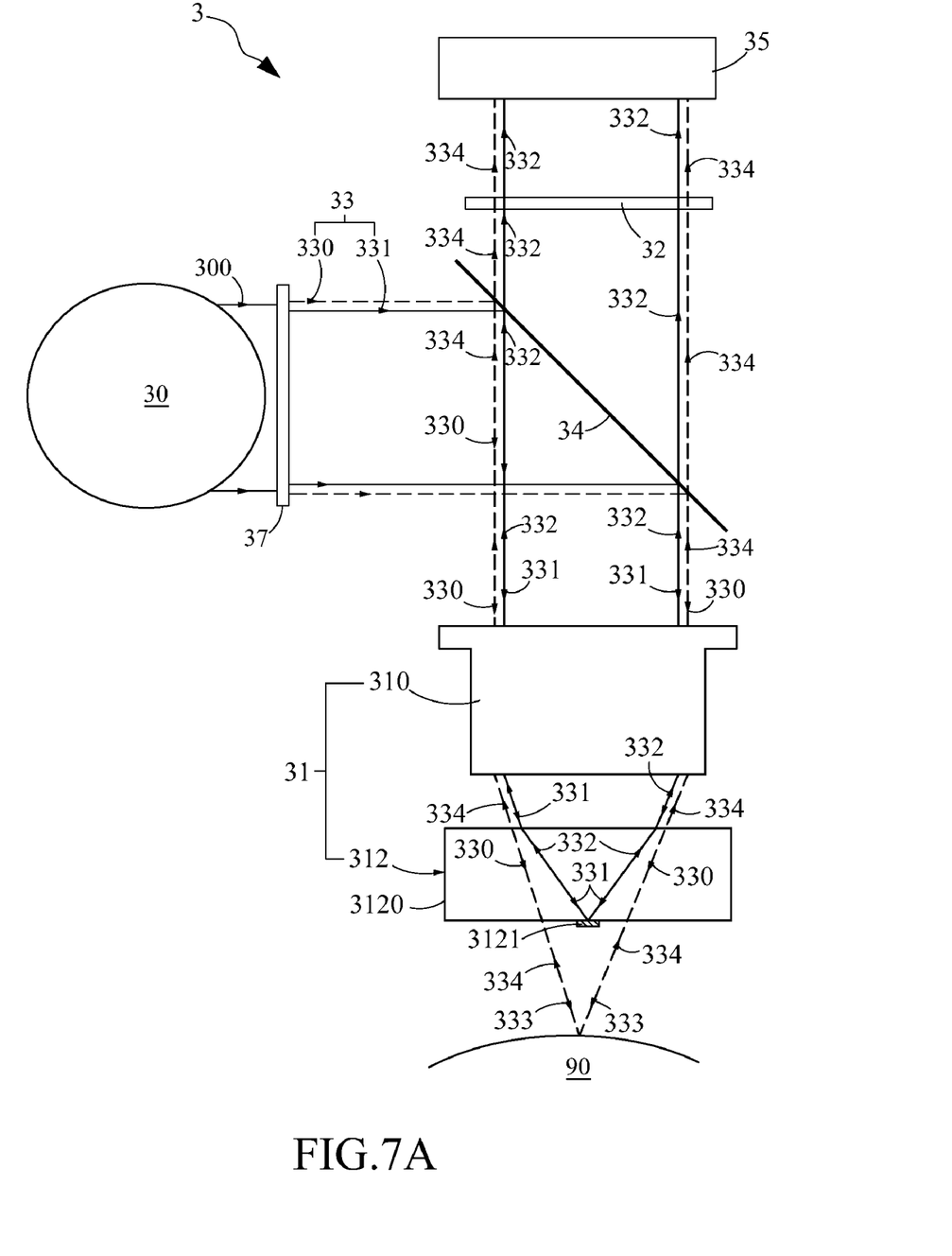
FIG. 7A and FIG. 7B show two different interferometric systems according to another two embodiments of the present invention.

Please refer to FIG. 7A and FIG. 7B, which show two different embodiments of the interferometric system according to the present invention. In the embodiment shown in FIG. 7A, the beam-splitting module 312 includes a birefringent plate 3120 and a non-polarization reflective unit 3121. The beam-splitting module 312 is used for splitting the light 33 into a first polarization component 330 and second polarization component 331 wherein the polarizations of the first and second polarization components are orthogonal to each other. The first polarization component 330 passing through the birefringent plate 3120 for forming an inspection light 333 is projected onto a measured object 90, thereby being reflected to form an object light 334 containing information corresponding to the surface profile of the measured object 90. At the same time, the second polarization component 331 is reflected by the non-polarization reflective unit 3121 so as to form a reference light 332. Thereafter, the object light 334 and the reference light 332 are combined by the birefringent plate 3120 into a combined light with the polarizations of the object light and the reference light being orthogonal to each other. It is noted that the aforesaid combined light can be modulated in a manner the same as those described in the foregoing embodiments and thus will not be described further hereinafter.

Figure 7B:
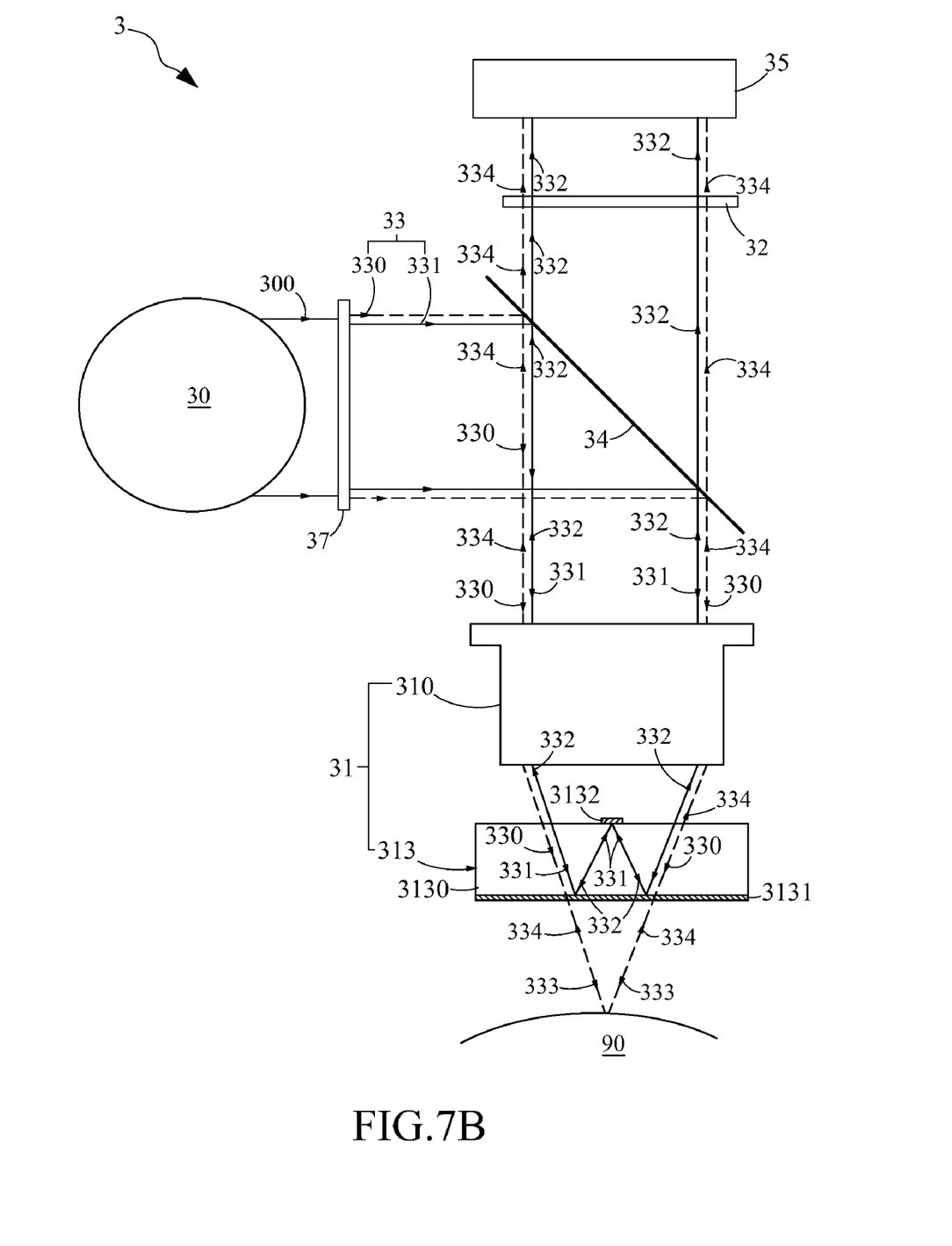

In the embodiment shown in FIG. 7B, the beam-splitting module 313 comprises a substrate 3130, a polarization beam-splitting layer 3131 and a non-polarization reflective layer 3132. The substrate 3130 is made of a transparent material for allowing the light 33 to pass therethrough. The material of the substrate 3130 can include, but should not be limited to, a piece of glass or plastics. When the light 33 is projected onto the polarization beam-splitting layer 3131, the first polarization component 330 passing through the polarization beam-splitting layer 3131 forms the inspection light 333 while the second polarization component 331 reflected from the polarization beam-splitting layer 3131 is projected onto the non-polarization reflective layer 3132 and thereby being reflected therefrom so as to form a reference light 332. The inspection light 333 is projected onto a measured object 90 and, consequently, is reflected to form an object light 334 containing information corresponding to the surface profile of the measured object 90. Thereafter, the object light 334 and the reference light 332 are combined by the polarization beam-splitting layer 3131 into a combined light wherein the polarizations of the object light and the reference light are orthogonal to each other. It is noted that the aforesaid combined light can be modulated in a manner the same as those described in the foregoing embodiments and thus will not be described further hereinafter.

Figure 8:
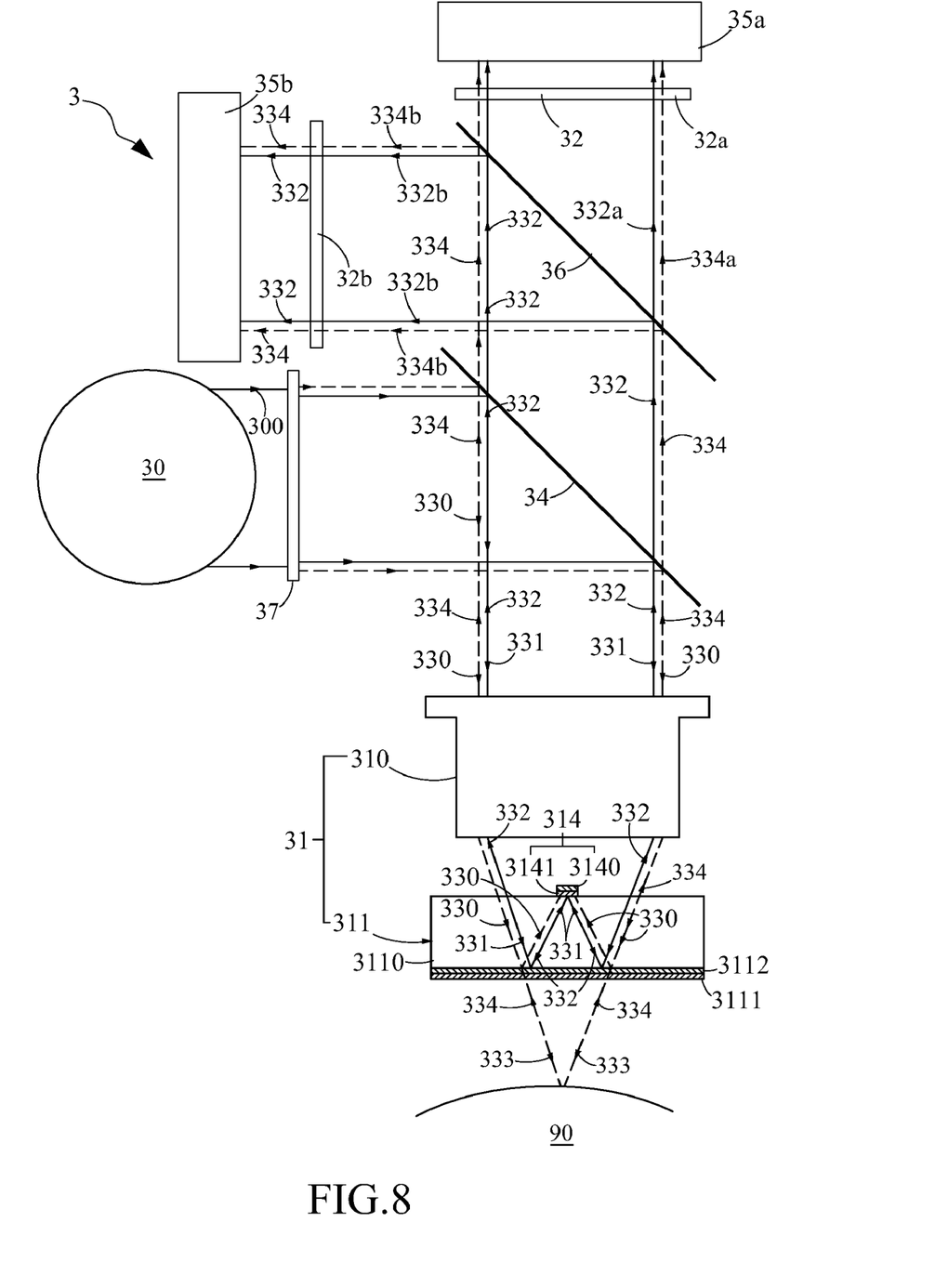
FIG. 8 shows an interferometric system according to further yet another embodiment of the present invention.

Please refer to FIG. 8, which shows another embodiment of interferometric system according to the present invention. The interferometric system shown in FIG. 8 is basically the same as the one shown in FIG. 6, but is characterized in that: the analysis module used in the embodiment of FIG. 8 includes a plurality of analyzers, as the two analyzers 32a and 32b illustrated in FIG. 8. It is noted that the number of analyzers required in the analysis module is dependent upon and corresponding to the amount of sub-combined lights in the interferometric system. Moreover, it is noted that any analyzer in the analysis module can be a linear polarizer. In FIG. 8, the combined light is divided into two sub-combined light by a non-polarization device 36 wherein one has an object light 334a and a reference light 332a while another has an object light 334b and a reference light 332b. In FIG. 8, the two analyzers 32a, 32b are disposed respectively on the optical paths of the two sub-combined lights so as to form two interference patterns accordingly. Similar to the previously mentioned principle for generating inference pattern with high contrast, the two analyzers 32a, 32b are in-plane rotated so as to adjust the polarization orientations of the two analyzers 32a, 32b, thereby increasing the contrast of the resulting interference patterns utilized in the profilometry process for analyzing the surface profile of the measured object accurately.

In the embodiments shown in FIG. 6, FIG. 7A, FIG. 7B and FIG. 8, the light 33 is provided directly from the light source 30. Alternatively, a light 300 emitted from the light source 30 can be modulated by a polarization device 37 so as to form the light 33.

With respect to the above description then, it is to be realized that the optimum dimensional relationships for the parts of the present invention, to include variations, e.g. sizes, materials, shapes, forms, functions and manners of operations, and uses, are deemed readily apparent and obvious to one skilled in the art, and all equivalent relationships to those illustrated in the drawings and described in the specifications are intended to be encompassed by the present invention.

What is claimed is:

1. A method of orthogonal-polarization Mirau interferometry, comprising the steps of:

splitting a focused narrow-band or broad-band incident light into a reference light and an inspection light by using a beam-splitting module wherein the polarizations of the reference light and the inspection light are orthogonal to each other;

projecting the inspection light onto a measured object, thereby forming an object light containing information corresponding to the surface profile of the measured object;

combining the object light and the reference light into a combined light by using the same area of the beam-splitting layer with the polarizations of the object light and the reference light being orthogonal to each other; and modulating the polarizations of the object light and the reference light such that the object light and the reference light interfere with each other and the intensity of the object light and the intensity of the reference light are close, wherein the beam-splitting module further comprises:

a non-polarization beam-splitting layer, for splitting the focused narrow-band or broad-band incident light into the reference light and the inspection light;

a first polarization layer, for modulating the inspection light into a polarized light with a specified polarization; and a polarization-reflective layer, for reflecting and polarizing the reference light so as to make the polarization of the reference light orthogonal to the polarization of the inspection light.

2. The method of orthogonal-polarization Mirau interferometry of claim 1, wherein modulating the polarizations of the object light and the reference light is performed by using an analyzer.

3. The method of orthogonal-polarization Mirau interferometry of claim 2, wherein the analyzer is a linear polarizer.

4. The method of orthogonal-polarization Mirau interferometry of claim 1, wherein modulating the polarizations of the object light and the reference light further comprises the steps of:

splitting the combined light into a plurality of sub-combined lights; and modulating the polarizations of the object light and the reference light in each sub-combined lights by using a corresponding analyzer.

5. The method of orthogonal-polarization Mirau interferometry of claim 4, wherein at least one of the corresponding analyzers is a linear polarizer.

6. An orthogonal-polarization Mirau beam-splitting module comprising:

a splitting means for splitting a focused narrow-band or broad-band incident light into a reference light and an inspection light projected onto a measured object by using an area of a beam-splitting layer so as to form an object light containing information corresponding to the surface profile of the measured object wherein the polarizations of the reference light and the inspection light are orthogonal to each other; and a combining means for combining the object light and the reference light into a combined light by using the same area of the beam-splitting layer with the polarizations of the object light and the reference light being orthogonal to each other;

wherein the splitting and the combining means are performed by using components of:

a non-polarization beam-splitting layer, for splitting the focused narrow-band or broad-band incident light into the reference light and the inspection light;

a first polarization layer, for modulating the inspection light into a polarized light with a specified polarization; and a polarization-reflective layer, for reflecting and polarizing the reference light so as to make the polarization of the reference light orthogonal to the polarization of the inspection light.

7. The orthogonal-polarization Mirau beam-splitting module of claim 6, wherein the polarization-reflective layer further comprises:

a non-polarization reflective layer; and a second polarization layer, arranged between the non-polarization beam-splitting layer and the non-polarization reflective layer.

8. An orthogonal-polarization Mirau interferometric system, comprising:

a light source, for providing a narrow-band or broad-band incident light;

an objective, for focusing the narrow-band or broad-band incident light to form a focused narrow-band or broad-band incident light;

a beam-splitting module, for splitting the focused narrow-band or broad-band incident light into a reference light and an inspection light projected onto a measured object by using an area of a beam-splitting layer so as to form an object light containing information corresponding to the surface profile of the measured object, and then making the object light be combined with the reference light by using the same area of the beam-splitting layer so as to form a combined light in a manner that the polarizations of the object light and the reference light are orthogonal to each other, wherein the beam-splitting module further comprises:

a non-polarization beam-splitting layer, for splitting the focused narrow-band or broad-band incident light into the reference light and the inspection light;

a first polarization layer, for modulating the inspection light into a polarized light with a specified polarization; and a polarization-reflective layer, for reflecting and polarizing the reference light so as to make the polarization of the reference light orthogonal to the polarization of the inspection light; and an analysis module, for modulating the polarizations of the object light and the reference light to make the object light and the reference light interfere with each other and to make the intensity of the object light and the intensity of the reference light close so as to form at least one interference pattern.

9. The orthogonal-polarization Mirau interferometric system of claim 8, wherein the polarization-reflective layer further comprises:

a non-polarization reflective layer; and a second polarization layer, arranged between the non-polarization beam-splitting layer and the non-polarization reflective layer.

10. The orthogonal-polarization Mirau interferometric system of claim 8, wherein the analysis module further comprises at least one analyzer.

11. The orthogonal-polarization Mirau interferometric system of claim 10, wherein at least one of the analyzers is a linear polarizer.

12. The orthogonal-polarization Mirau interferometric system of claim 8, further comprising:

at least one imaging device, for capturing the interference pattern.

* * * * *